United States Patent [19]
Fink et al.

[11] 3,725,635
[45] Apr. 3, 1973

[54] METHOD OF AND APPARATUS FOR WELDING AN END PLUG ONTO A NUCLEAR FUEL ELEMENT

[75] Inventors: Robert W. Fink, Saltsburg; Eugene S. Boyko, Monroeville, both of Pa.

[73] Assignee: Westinghouse Electric Corporation, Pittsburgh, Pa.

[22] Filed: Aug. 20, 1971

[21] Appl. No.: 173,487

[52] U.S. Cl............219/121 P, 219/121 R, 219/137, 176/79
[51] Int. Cl. ..............................................B23k 9/00
[58] Field of Search........219/121 R, 121 P, 121 EB, 219/121 EM, 136, 137; 176/79, 68

[56] References Cited

UNITED STATES PATENTS

| 3,519,537 | 7/1970 | Ferrari | 176/68 |
| 3,053,743 | 9/1962 | Cain, Jr. | 176/79 X |

FOREIGN PATENTS OR APPLICATIONS

| 647,193 | 4/1964 | Belgium | 176/79 |
| 1,033,246 | 6/1966 | Great Britain | 176/79 |
| R42,444 | 6/1970 | Japan | 176/79 |

Primary Examiner—J. V. Truhe
Assistant Examiner—Gale R. Peterson
Attorney—A. T. Stratton et al.

[57] ABSTRACT

Welding methods and apparatus for bonding a metallic end plug into an end of a metallic fuel tube or rod for a nuclear reactor. Defects in the weld joint between the fuel tube and end plug are substantially reduced by arc welding in a chamber filled with an inert gas, disposing the welding electrode directly over the joint to be welded, deflecting plasma produced during the welding away from the body of the fuel tube, and directing the plasma into the joint.

17 Claims, 4 Drawing Figures

METHOD OF AND APPARATUS FOR WELDING AN END PLUG ONTO A NUCLEAR FUEL ELEMENT

BACKGROUND OF THE INVENTION

1. Field of the Invention

The invention relates in general to nuclear fuel assemblies, and more specifically to new and improved methods and apparatus for welding metallic end plugs into the ends of metallic fuel tubes which contain the nuclear fuel.

2. Description of the Prior Art

Fuel elements or rods for nuclear reactors commonly encase the fissile material in thin walled cladding or tubing, which serves to support the nuclear fuel during the operation of the reactor. The cladding also prevents contact and chemical reactions between the fuel and its surroundings, such as the water in a pressurized water reactor, and it confines the radioactive fission products. The cladding must be corrosion resistant, non-reactive, and heat conductive, with commonly used materials being stainless steel, such as type 304, or a zirconium base alloy, such as zircaloy-2 or zircaloy-4. Zirconium base alloys are preferable to stainless steel because of the relatively low capture cross-section of zirconium with respect to thermal neutrons.

The nuclear fuel, which is usually in the form of cylindrical pellets of uranium dioxide ($UO_2$) enriched with U-235, is hermetically sealed in the thin walled tubing or cladding. Since a typical nuclear reactor used in the generation of electrical power has thousands of individual fuel tubes, each requiring two end closures, and since it is critical that the end closures be gas-tight and mechanically strong to contain the radioactive fission products, the end closures have been the subject of considerable research. Many different methods of enclosing the ends have been proposed. The mechanical methods, which include spinning, crimping, swaging, and the like, often produce leaky joints. Welding methods, such as arc welding, in which end plugs are welded to the tubing ends, often results in defects such as cracking, porosity, distortion of the tubing adjacent to the inner extension of the end plug, and a reduction in the thickness of the tubing adjacent the weld, referred to as I.D. undercut. Thus, it would be desirable to provide gas tight, mechanically strong, corrosion resistant end closures for nuclear fuel cladding, with methods and apparatus which reduce closure defects to only a few percent.

SUMMARY OF THE INVENTION

Briefly, the present invention relates to new and improved apparatus and methods for closing the ends of a nuclear fuel assembly by electric arc welding. An end plug for closing an end of a fuel tube is constructed to partially extend into the tubing, and to start at the end of the fuel tube with a diameter which is substantially the same as the outside diameter of a fuel tube, thus providing a butt joint between the end of the fuel tube and a shoulder on the end plug. The end plug is placed in one end of the fuel tube, and this end is disposed through an access opening in a welding chamber. The welding chamber includes an end stop for positioning the fuel tube and end plug assembly within the chamber, and a welding electrode. The welding electrode is positioned directly over the butt joint. A non-contaminating plasma deflector is positioned about the fuel tube, adjacent to but spaced from the butt joint by a predetermined dimension. The welding chamber is filled with an inert gas, the fuel tube is rotated about its longitudinal axis, and an electric arc is established between the welding electrode and the butt joint formed between the fuel tube and end plug. The plasma deflector, which is disposed to rotate with the fuel tube, deflects plasma formed by the electric arc away from the body portion of the thin-walled fuel tube or cladding, and it directs it into the butt joint. The plasma deflector enables the welding electrode to be successfully positioned directly over the butt joint, without overheating of the fuel tube, providing leakproof, high strength welding bonds. Further, the use of the plasma deflector resulted in reduced sensitivity to parameter variations, such as current, voltage, speed of rotation, and electrode position.

The inside diameter of the plasma deflector is selected to prevent the electric arc from entering the space between the inside diameter of the plasma deflector and the outside diameter of the fuel tube, and is preferably selected such that the plasma deflector functions as a gauge on the maximum diameter of a fuel tube adjacent the weld. The outside diameter and length of the plasma deflector are preferably selected to aid in properly aligning the fuel tube with the driving chuck, the access opening in the welding chamber, and the end stop, by extending the plasma deflector through the access opening, with the clearance between the outside diameter of the plasma deflector and the diameter of the access opening being selected such that the fuel tube and plasma deflector will freely rotate only when the driving chuck, access opening and end stop are closely aligned.

BRIEF DESCRIPTION OF THE DRAWING

The invention may be better understood and further advantages and uses thereof more readily apparent, when considered in view of the following detailed description of exemplary embodiments, taken with the accompanying drawings, in which.

DESCRIPTION OF PREFERRED EMBODIMENTS

Figure 1:
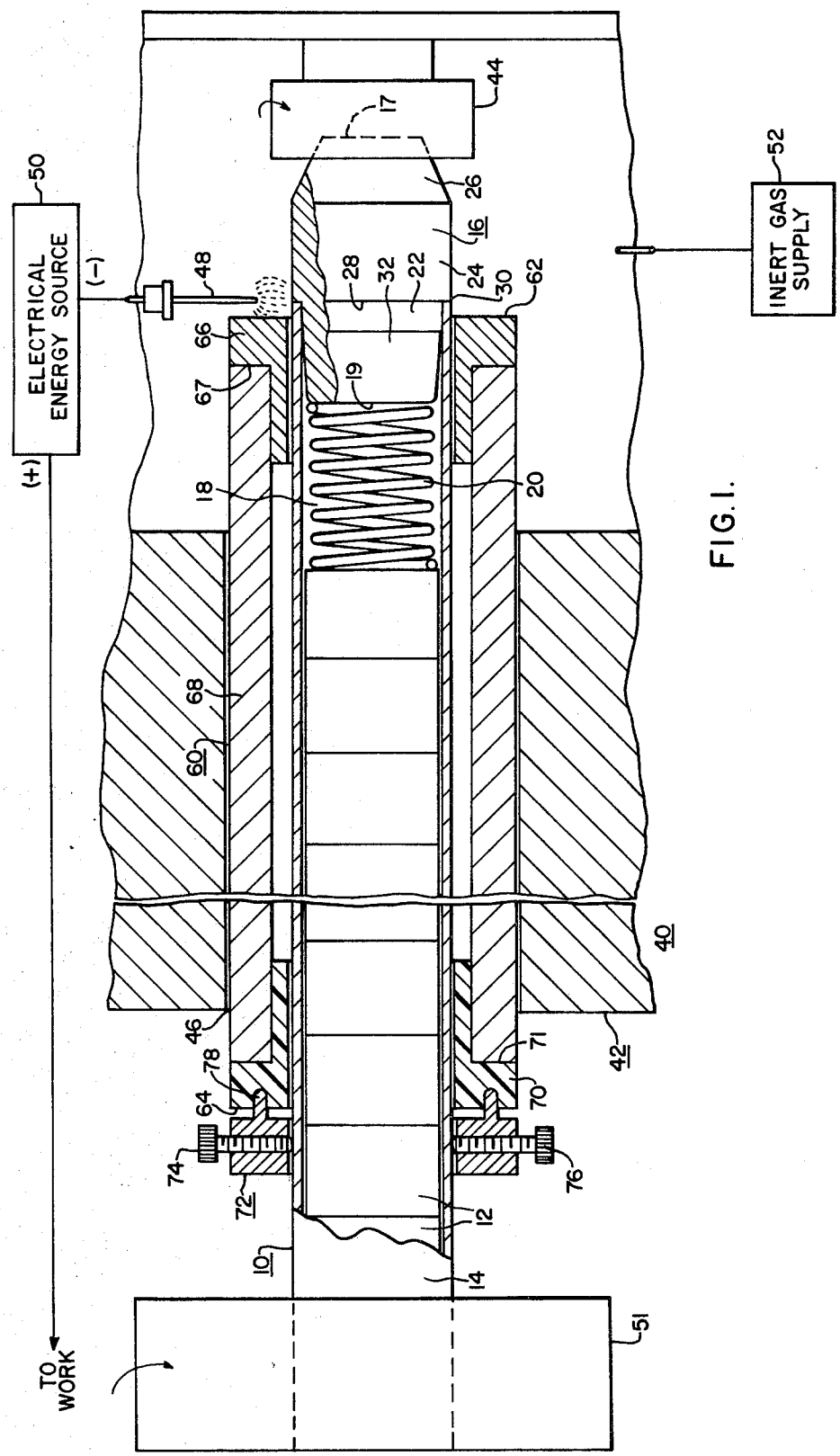
FIG. 1 is a fragmentary, elevational view, partially in section, of welding apparatus constructed and arranged according to the teachings of the invention.

Referring now to the drawings, and FIG. 1 in particular, there is shown an exemplary embodiment of a nuclear fuel rod or assembly 10 which may utilize the teachings of the invention. The fuel assembly 10 includes a plurality of cylindrical nuclear fuel pellets 12, such as $UO_2$ enriched with U-235, disposed end to end within cladding or fuel tube 14. The fuel tube 14 is an elongated thin-walled tube, with a typical fuel tube having an outside diameter of less than 0.5 inch, a wall thickness which depends upon the type of cladding material, and whether or not the inside of the fuel tube is to be pressurized, but usually in the range of about 0.016 to 0.023 inch, and a length which varies within wide limits. The cladding material may be an austenitic stainless steel, such as type 304, which enables quite large diameter to wall thickness ratios to be used, or a zirconium alloy, which is preferable to stainless steel from the standpoint of neutron absorption, but which must be designed with slightly lower diameter to thickness ratios. Such a zirconium alloy might contain by weight 1.2 to 1.7 percent tin, 0.07 to 0.20 percent iron, 0.05 to 0.15 percent chromium, 0.03 to 0.08 percent nickel and 97.87 to 98 percent zirconium. A specific zirconium alloy may contain 1.5 percent tin, 0.12 percent iron, 0.10 percent chromium, 0.05 percent nickel, with the balance zirconium.

The ends of the fuel tube 14 are closed with end plugs formed of the same material as the fuel tube, such as end plug 16 shown in FIG. 1. A plenum chamber 18 is provided within the fuel tube 14, between one end of the axial stack of fuel pellets 12 and the adjacent end plug, such as end plug 16, and the pellets 12 are maintained in the desired position and prevented from movement during shipping by a spring 20 disposed between the end of the stack of fuel pellets and the end plug.

In the exemplary embodiment of the fuel assembly 10 shown in FIG. 1, an end plug similar to end plug 16 has already been welded to the other end of the fuel tube 14, and the fuel tube is then filled with the fuel pellets 12, the spring 20 is disposed at the end of the stack, and end plug 16 is pressed into the open end of the fuel tube 14, compressing the spring 20. Surface 22 of end plug 16 has a diameter selected to provide a press fit with the inside diameter of the fuel tube, in order for the end plug to maintain its assembled position while compressing the spring 20 against the stack of fuel pellets 12.

The step of welding end plug 16 to fuel tube 14 may complete the sealing of the fuel tube 14; or, the last of the two end plugs to be welded to the fuel tube, such as end plug 16, may include a small axial opening (not shown) which extends between its ends, in the event the fuel rod 10 is of the type which is pressurized with an inert gas. If fuel rod 10 is to be pressurized, this step follows the step of welding end plug 16 to the fuel tube 14. Application Ser. Nos. 680,863 and 96,153, filed Nov. 6, 1967 and Dec. 8, 1970, respectively, both of which are assigned to the same assignee as the present application, disclose methods for sealing the axial opening in the pressurized type of fuel rod.

End plug 16 has first and second ends 17 and 19, respectively, and an intermediate cylindrical outer surface 24 which defines the largest outside diameter of the end plug 16, with this diameter selected to be substantially the same as the outside diameter of the fuel tube 14. End 17 of plug 16, which is external to the fuel tube when the end plug is assembled therewith, has a smaller diameter than surface 24, with a tapered surface 26 extending from end 17 to surface 24 of the end plug 16. End 19 of plug 16 is disposed within the fuel tube 14, with the outermost surface 24 stepping perpendicularly inward to cylindrical surface 22, forming a shoulder 28 between surfaces 22 and 24, with this shoulder butting against the extreme end of the fuel tube 14 to form a butt joint 30 between the fuel tube and end plug. Surface 22, as hereinbefore stated, has a diameter selected to provide a press fit with the inside diameter of the fuel tube, holding the end plug 16 in assembled relation with the fuel tube, and also providing support and metallic back-up for the thin-walled fuel tube during the welding operation. A slightly tapered surface 32 extends from surface 22 to end 19 of the fuel plug 16, with end 19 having a slightly smaller outside diameter than surface 22 in order to facilitate insertion of the end plug 16 into the tube 14 and to properly align the end plug with the fuel tube during the pressing of the end plug into assembled relation with the fuel tube.

The end plug 16 is welded to the fuel tube 14 at the butt joint 30, by disposing a welding electrode adjacent to joint 30 and initiating an arc between the electrode and the base metal. Bonding and hermetic sealing is obtained by a localized progressive melting, producing a flowing together of adjacent edges of the butt joint, and sealing solidification of the metal surrounding the butt joint, as the fuel tube 14 and end plug are rotated about the longitudinal axis of the fuel tube adjacent to the stationary welding electrode.

Figure 2:
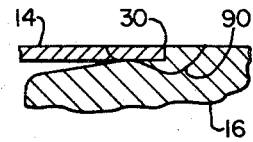
FIGS. 2 and 3 are fragmentary, cross-sectional views of typical weld patterns produced on nuclear fuel assemblies according to the teachings of the prior art, and according to the teachings of the invention, respectively.

With a butt type joint, the welding electrode is preferably disposed such that its centerline is substantially aligned with the butt joint. However, with the thin-walled fuel tube and end plug, disposing the welding electrode directly over the butt joint 30 and using prior art welding apparatus and methods, results in overheating of the fuel tube, in order to obtain the weld penetration required in the end plug 16. Thus, it is necessary to move the location of the welding electrode relative to the joint, such that it is on the end plug side of the joint 16. This arrangement produces a weld pattern which is quite deep in the end plug, and for best results the pattern should cross into the end of the fuel tube near its inner edge. FIG. 2 is a cross-sectional view of the butt joint 16 illustrating a typical weld pattern 34 obtained by arc welding the end plug to the fuel tube with the welding electrode disposed on the end plug side of the butt joint 30.

As hereinbefore stated, the best results from the standpoint of reducing weld defects are obtained when the weld pattern crosses into the fuel tube at or near its inner corner. This pattern, however, is difficult to obtain and to maintain consistently from weld to weld, in the situation where the welding electrode is disposed on the end plug side of the butt joint. The resulting pattern is extremely sensitive to parameter variation, such as current, voltage, rotational speed, and electrode position. Defects in the fuel rod due to welding, include distortion of the fuel tube immediately adjacent to where the fuel tube is no longer supported internally by the end plug, I.D. undercut which reduces the wall thickness of the fuel tube below the acceptable minimum, and porosity which may leak, or cause a leak at the high internal and external pressures the fuel rod is subjected to during use. The welded joint is subjected to severe strain due to repeated thermal contraction and expansion of the fuel pellets 12 in response to cyclic power demands made on the reactor. The weld defects hereinbefore set forth are primarily due to overheating, and stress annealing of the fuel tube, arc wander, and difficulty in obtaining a uniform weld puddle width. Also, certain defects, such as porosity and I.D. undercutting, may also be caused by misalignment between the fuel tube and end plug.

The present invention relates to new and improved methods and apparatus for welding end plugs to fuel tubes, which substantially reduces weld defects, aids alignment, and automatically gauges the weld build-up dimension.

More specifically, FIG. 1 illustrates new and improved welding apparatus 40 which includes a welding chamber 42 having a rotatable end stop 44, an access opening 46 coaxially aligned with the end stop 44, a welding chamber 48, a source of electrical energy, a rotatable driven chuck 51, such as a pneumatic chuck, and means 52 for providing an inert gas which is a good atmosphere for arc welding. Argon, helium, and helium-argon mixture are examples of suitable gases, with helium being preferred.

Electrode 48 is of the non-consumable type, with a 2 percent thoriated tungsten being preferable. Electrode 48 is connected to one side of source 50, such as to the negative terminal of a conventional direct current welder, and the positive terminal is adapted for connection to the work or fuel tube being welded.

A plasma deflector 60 is provided which rotates with the fuel tube 14 during welding, with the plasma deflector 60 functioning to deflect plasma, i.e, ionized gases formed by the electrical welding arc, away from the fuel tube and to redirect this plasma into the butt joint 30. It does not function as a chill block, and unlike a chill block, it is spaced away from the fuel tube 14 during the welding operation by a predetermined dimension, as will be hereinafter explained. Conventional chill blocks are not acceptable as they may contaminate the weld and induce corrosion and subsequent failure of the weld joint. Plasma deflector 60 may also provide the important functions of maintaining alignment of the fuel tube and end plug during welding, which is essential if sound welds are to be consistently obtained, and to automatically inspect or gauge the fuel rod for maximum weld build-up.

More specifically, plasma deflector 60 is a tubular, elongated assembly having first and second ends 62 and 64, respectively. In order to prevent weld contamination, the front end 62 is faced with the same material as the fuel tube is formed of. Therefore, if zircaloy-4 is used for the fuel tube 14, a tubular member 66 formed of zircaloy-4 would be disposed at end 62 of a plasma deflector 60. Tubular end member 66 has an inside diameter selected to provide a predetermined clearance between it and the outside diameter of the fuel tube 14. The minimum clearance is the maximum weld build-up dimension, and the maximum clearance is that clearance beyond which the electric arc and plasma will start to enter the opening. By selecting the clearance such that the plasma deflector 60 will just be removable from the fuel tube over the weld, when the weld dimension is at its maximum limit, the plasma deflector will function as an automatic gauge on the weld build-up. Since the maximum allowable weld build-up is usually about 10 mils, the inside diameter of end member 66 may be 10 mils greater than the outside diameter of the fuel tube 14. A total clearance of about 10 mils is not too great from the standpoint of allowing plasma and the electric arc access to the area under the end piece 66. A 10 mil total clearance is also a suitable dimension for allowing the shielding gas to escape from the welding chamber 42 and still provide a positive pressure of shielding gas within the chamber, to properly protect the welding operation.

End piece 66 proceeds from end 62 for a predetermined dimension, which is about 0.125 inch, and it then steps perpendicularly inward to a smaller diameter surface, forming a flange or shoulder 67 for accepting a metallic tubular intermediate member 68. Since the intermediate member 68 is spaced from the fuel tube by the end piece 66, it will not contaminate the fuel tube in the vicinity of the weld, and it may thus be formed of a material such as copper. The second end 64 includes a tubular end piece 70 which may be shaped similar to the first end piece 66, having an inside diameter about 10 mils greater than the outside diameter of the fuel tube 14, and a shoulder 71 for receiving and supporting the other end of the intermediate tubular member 68. since the second end piece 70 will not contact or be adjacent to hot metal, it may be formed of an insulating material such as polytetrafluoroethylene, or one of the polyamides.

Proper alignment of the fuel tube 14 and end plug 16 is of the utmost importance if defect free welds are to be consistently obtained. The plasma deflector may provide the function of facilitating and maintaining the required alignment by selecting the outside diameter of the plasma deflector, and the diameter of the access opening 46, such that a total clearance between the two of less than 1 mil is provided, and performing the welding step with the plasma deflector partially within and partially outside of the enclosure 42. The wall of enclosure 42 through which the opening 46 extends should be relatively thick such as one to 4 inches. With the close clearance between the plasma deflector 60 and the access opening, and the relatively thick wall, the plasma deflector will rotate freely with the rotating fuel tube 14 only when the axes of the chuck 51, the fuel tube 14, end plug 16 and end stop 44 are properly aligned.

As hereinbefore stated, the plasma deflector 60 is rotated with the fuel rod 14 during the welding step, in order to prevent the first end 66 thereof from becoming overheated during the welding operation. The rotation of the plasma deflector 60 may be accomplished by fixing it to the fuel rod 14, as illustrated in FIG. 1. For example, a ring member 72 may be used which has an opening selected to enable it to be slipped over the fuel tube 14, with the ring member 72 having a plurality or set or thumb screws disposed in circumferentially spaced relation, with the longitudinal axes of the thumb screws being perpendicular to the central axis of the ring member. Two thumb screws 74 and 76 are illustrated in FIG. 1, but three or four would be required. The ring member has an inside diameter size to easily receive the fuel tube 14, and the ring member is disposed adjacent to end 64 of the plasma deflector 60. Ring member 72 is mechanically coupled to the plasma deflector 60 by any suitable means, such as by members 78 which snap into suitably sized openings in end 64 of the plasma deflector. Adjustment of the set screws will not only fix the plasma deflector to the fuel tube, but it enables uniform spacing of the plasma deflector 60 relative to the fuel tube 14 to be easily achieved.

Figure 4:
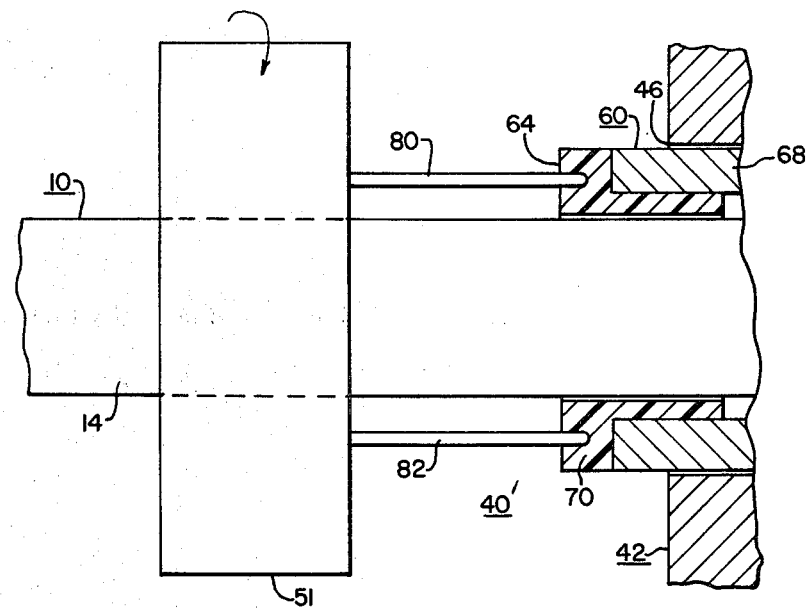
FIG. 4 is a fragmentary, elevational view, partially in section, which illustrates the welding apparatus of FIG. 1 except modified according to another embodiment of the invention.

The arrangement for rotating the plasma deflector 60 with the fuel tube 14 shown in FIG. 1 requires that the plasma deflector be adjusted for each welding operation. FIG. 4 is a fragmentary view of welding apparatus 40' which is similar to welding apparatus 40 shown in FIG. 1, except modified to rotate the plasma deflector 60 directly from the driven chuck 51. A plurality of rod members, such as rod members 80 and 82 are disposed to mechanically link the chuck 51 and end 64 of the plasma deflector 60. With the FIG. 4 arrangement, once the chuck position is adjusted to properly locate the plasma deflector 60 within the access opening 46, it will not be necessary to set up the plasma deflector 60 for each welding step. The chuck and welding chamber may be mounted on a common steel base and fixed with locating pins once alignment is achieved. The distance between the chuck 51 and end stop 44 should be as short as possible, to prevent flexing of the fuel tube 14.

Figure 3:
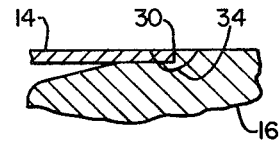

In the operation of the welding apparatus 40, or 40', one end of the fuel tube 14, with the end plug 16 pressed into position, is inserted through the chuck 51, through the plasma deflector 60 and access opening 46, and into the welding chamber 42. The fuel tube is advanced into the chamber 42 until end 17 of the end plug 16 is resting against the rotary stop bearing 44. Chuck 51 may then be actuated to grip the fuel tube. The welding electrode 48 is positioned directly over the butt joint 30, and properly spaced therefrom, such as about 0.0625 inch. Plasma deflector 60 is located such that its end 62 is approximately 0.020 to 0.070 inch from the butt joint 30, on the fuel tube side thereof. The exact location of end 62 within this range may influence the position of the electrode 48 somewhat, in order to prevent melting of the plasma deflector end adjacent to the electrode. Once the proper spacing of end 62 from the joint 30 is obtained, the plasma deflector is secured to the fuel tube, or to the chuck, such that it rotates when the fuel tube 14 rotates. Welding chamber 42 is then pressurized with an inert gas, such as helium. Chamber 42 is purged by an opening (not shown) which enables the air in the chamber to be supplanted by the inert gas. The drive for rotating the chuck 51 is then actuated. Welding current is then applied to the electrode 48. A rotational speed of 15 to 17 R.P.M., a current in the range of 36 to 48 amperes, and an arc voltage of 14 to 16 volts, produced excellent welds with one revolution of the fuel tube at constant current, with a subsequent 2 to 4 second taper programmed to reduce the welding current to zero. With the plasma deflector in place, the parameters such as current, voltage, rotational speed and electrode position were found to be less critical. Further, the deflection of the plasma away from the tube and into the weld joint 30 enables the electrode 48 to be successfully placed substantially directly over the butt joint 30, as the weld may be made with a single revolution at constant current. The plasma is directed into the desired area at the joint 30, without overheating the fuel tube, resulting in a weld pattern 90 such as illustrated in FIG. 3, which is substantially symmetrical with respect to the fuel tube and end plug. This rapid heating in the area of the butt joint 30, without overheating of the fuel tube, substantially reduces weld defects due to sagging, porosity, and reduction in tube thickness (I.D. undercut), and the plasma deflector 60 also promotes and maintains alignment of the fuel tube, which also aids in reducing weld defects. Further, by properly sizing the inside diameter of the end pieces of the plasma deflector 60, if the plasma deflector can be removed from the fuel tube after the welding operation without machining the weld, the weld build-up is within tolerance.

The new and improved welding apparatus 40 shown in FIG. 1, or the welding apparatus 40' shown in FIG. 4, may be used to weld a metallic end plug into the end of a metallic reactor tube by the steps of providing a welding chamber 42 having an access opening 46 therein, positioning a welding electrode 48 within the welding chamber 42, providing a fuel tube 14 with an end plug 16 disposed in one end thereof, with a butt joint 30 between the end of the fuel tube and a shoulder 28 on the end plug 16. The fuel tube and end plug are inserted into the welding chamber 42 through the access opening 46, with the welding electrode 48 being oriented over the butt joint 30. The welding chamber is then pressurized with an insert gas, and the fuel tube and end plug are rotated about their longitudinal axes. An electric arc is established between the welding electrode 48 and the rotating fuel tube and end plug, and plasma generated by the electric arc is deflected away from the body portion of the fuel tube and redirected into the joint 30. Constant current is maintained for one revolution of the fuel tube, and then the welding current is reduced, permitting sealing solidification of the metal surrounding the butt joint 30. The deflection of the plasma formed by the electric arc which is adjacent to the tube side of the butt joint, away from the tube and into the joint, may be accomplished by a plasma deflector which may also be used to provide the steps of aligning the fuel tube, and automatically gauging the weld build-up dimension.

In summary, there has been disclosed new and improved welding methods and apparatus for substantially reducing weld defects while welding end plugs in the ends of fuel tubing for use in nuclear reactors. The substantial reduction in welding defects is obtained without contaminating the weld area, by deflecting and redirecting plasma produced by the electric arc, instead of using prior art techniques of using tightly fitted chill blocks disposed on the fuel tube immediately adjacent to the weld. The plasma deflector employed in the invention may be provided at a relatively low cost, and it may be dimensioned to cooperate with a welding chamber to promote and maintain alignment of the fuel tube during the welding operation, as well as to automatically gauge the weld build-up dimension following the welding step.

We claim as our invention:

1. A method of welding a metallic end plug into an end of an elongated fuel tube for a nuclear reactor, comprising the steps of:
   providing a welding chamber having an access opening,
   positioning a welding electrode within the welding chamber,
   providing a fuel tube having an end plug disposed in one end thereof, with a butt joint between the end of the fuel tube and a shoulder on the end plug,
   inserting the fuel tube and end plug into the welding chamber through the access opening, with the welding electrode oriented over the butt joint,
   purging the welding chamber with an inert gas, rotating the fuel tube and end plug about the longitudinal axis of the fuel tube, placing a plasma deflector in spaced relationship to the joint establishing an electric arc between the welding electrode and rotating fuel tube and end plug, deflecting plasma produced by the arc away from the body portion of the fuel tube and directing it into the joint between the fuel tube and end plug, and terminating the electric arc to permit sealing solidification of the metal surrounding the butt joint between the fuel tube and end plug.

2. The method of claim 1 wherein the step of deflecting the plasma into the joint includes the steps of providing an elongated plasma deflector having an opening sized to receive the fuel tube with a spacing which functions as a maximum outside diameter gauge on the fuel rod in the vicinity of the joint following the termination of the electric arc, inserting the fuel tube through the opening in the plasma deflector, positioning the plasma deflector on the fuel tube adjacent to but spaced from the joint by a predetermined dimension, and rotating the plasma deflector with the fuel tube during the step of establishing the electric arc between the welding electrode and fuel tube and end plug.

3. The method of claim 2 wherein the step of providing the plasma deflector includes the step of forming at least the end thereof which is adjacent to but spaced from the joint, of the same metal as the fuel tube.

4. The method claim 1 wherein the step of deflecting the plasma into the joint includes the steps of providing an elongated, cylindrical plasma deflector having an opening which extends between its axial ends sized to receive the fuel tube, and an outside diameter sized to snugly enter the access opening of the welding chamber with a spacing between the plasma deflector and access opening selected to permit free rotation of the fuel tube and plasma deflector relative to the welding chamber only when the longitudinal axis of the fuel tube is in the desired location for the step of establishing the electric arc, inserting the fuel tube through the opening in the plasma deflector with one end of the plasma deflector being within the welding chamber adjacent to but spaced from the joint by a predetermined dimension, and with the other end extending outside the welding chamber through the access opening, and rotating the plasma deflector with the fuel tube.

5. The method of claim 4 wherein the step of providing the plasma deflector includes the step of forming at least the end thereof which is adjacent to but spaced from the joint, of the same metal as the fuel tube.

6. The method of claim 1 including the steps of providing a rotatable stop within the welding chamber, and a rotatable chuck outside of the welding chamber, wherein the step of inserting the fuel tube and end plug into the welding chamber, includes the step of inserting the fuel rod through the chuck, and into the welding chamber, with the end plug resting against the rotatable stop.

7. The method of claim 6 wherein the step of deflecting the plasma into the joint includes the steps of providing an elongated, cylindrical plasma deflector having an opening which extends between its axial ends sized to receive the fuel tube with a predetermined clearance therebetween, and an outside diameter sized to snugly enter the access opening of the welding chamber, with the spacing between the plasma deflector and access opening being selected to permit free rotation of the fuel tube and plasma deflector only when the axes of the rotatable chuck, rotatable stop, and access opening of the welding chamber are substantially aligned, inserting the fuel tube through the opening in the plasma deflector, with one end of the plasma deflector being within the welding chamber adjacent to but spaced from the joint by a predetermined dimension, and with the other end extending outside the welding chamber through the access opening, and rotating the plasma deflector with the fuel tube.

8. The method of claim 7 wherein the step of providing the plasma deflector includes the step of selecting the diameter of its opening which receives the fuel tube such that it provides a spacing between the plasma deflector and fuel tube which functions as a maximum outside diameter gauge for the fuel tube in the vicinity of the joint, following the termination of the electric arc.

9. The method of claim 7 wherein the step of providing the plasma deflector includes the step of forming at least the end thereof which is disposed adjacent to the joint, of the same metal as the fuel tube.

10. Welding apparatus for welding a metallic end plug into an elongated fuel tube, wherein the joint to be welded is a butt joint between the end of the fuel tube and a shoulder on the end plug, comprising:

a welding chamber having an access opening, a welding electrode positioned within said welding chamber in welding relation to the joint to be welded when the fuel tube is inserted into the chamber, an end stop positioned within said welding chamber, means for providing said welding chamber with an inert gas atmosphere, a driven chuck positioned outside the welding chamber adjacent to the access opening, with the axes of the chuck, access opening and end stop being in substantial alignment, said chuck being adapted to receive, grip and rotate the fuel tube, and an elongated, cylindrical plasma deflector having a predetermined outside diameter, first and second ends, and an opening sized to receive a fuel tube with a predetermined clearance between the outside diameter of the fuel tube and inside diameter of the opening in the plasma deflector, said plasma deflector being positioned in the access opening such that one end is inside the welding chamber, adjacent to but spaced from the joint between the fuel tube and end plug, when the fuel tube and end plug are inserted through the chuck and plasma deflector and against the end stop.

11. The welding apparatus of claim 10 wherein the outside diameter of the plasma deflector is selected to allow free rotation of the plasma deflector relative to the welding chamber only when the axes of the chuck, plasma deflector, access opening, and end stop are substantially aligned.

12. The welding apparatus of claim 10 including means for rotating the plasma deflector when the chuck and fuel rod are rotated.

13. The welding apparatus of claim 10 wherein the predetermined clearance between the outside diameter of the fuel tube and the inside diameter of the opening in the plasma deflector is selected to function as a maximum diameter gauge for the joint area following welding of the fuel tube to the end plug at the butt joint.

14. The welding apparatus of claim 10 wherein at least the end of the plasma deflector which is adjacent to but spaced from the joint is formed of the same metal as the fuel tube.

15. The welding apparatus of claim 10 wherein at least the end of the plasma deflector which is adjacent to but spaced from the joint, is formed of an alloy of zirconium.

16. The welding apparatus of claim 10 including means for fixing the plasma deflector to the fuel tube after the fuel tube has been disposed through the plasma deflector, to permit the plasma deflector to rotate with the fuel tube when it is rotated by the chuck.

17. The welding apparatus of claim 10 including means interconnecting the chuck and plasma deflector, for directly rotating the plasma deflector when the chuck is rotated.

* * * * *